March 5, 1935. T. M. HAHN 1,993,058

METHOD AND APPARATUS FOR PRODUCING DIFFRACTION PATTERNS

Filed May 15, 1931   4 Sheets-Sheet 1

Inventor
Thomas Marshall Hahn
By Gillson, Mann + Cox
Attorneys

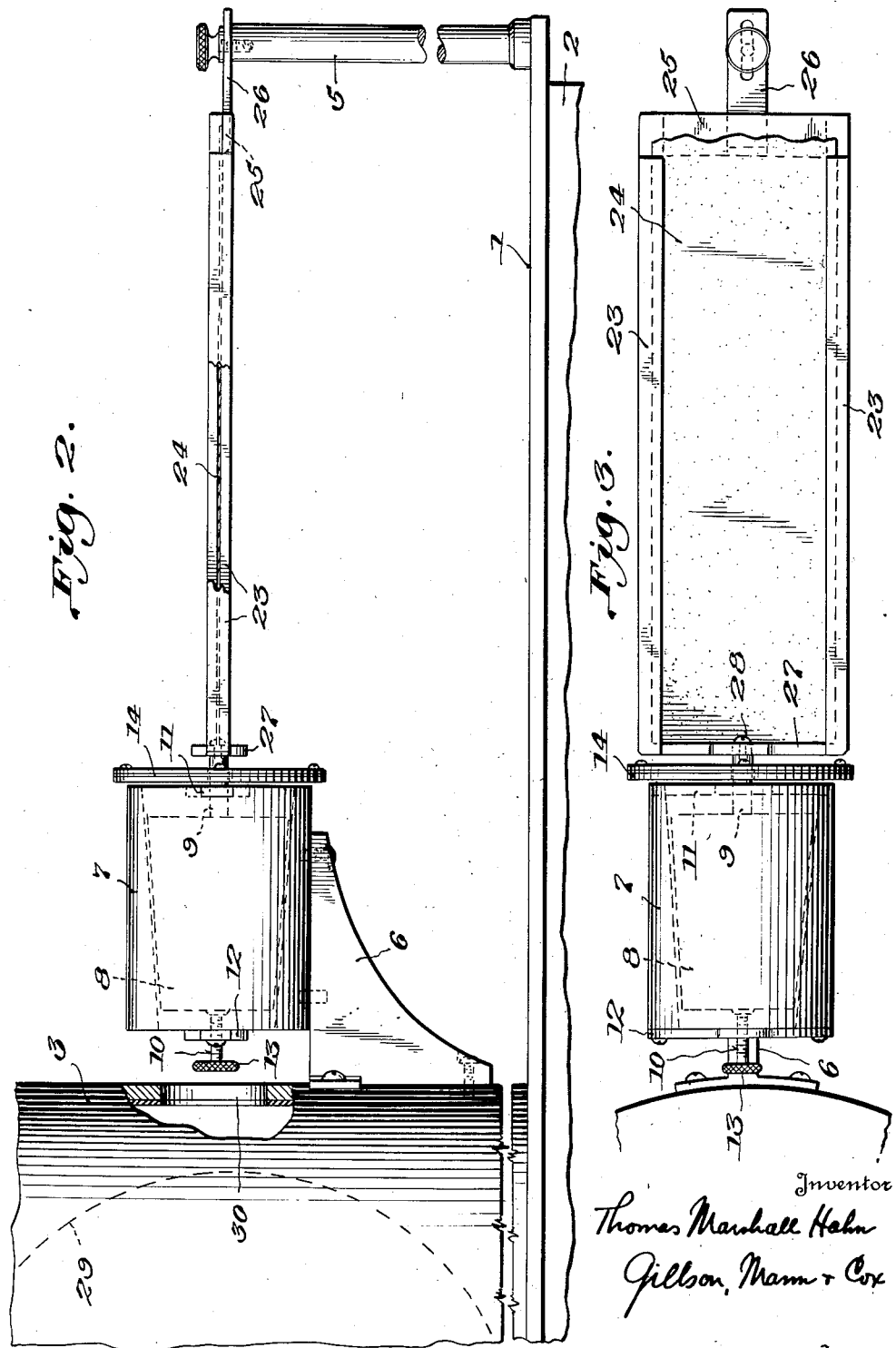

March 5, 1935. T. M. HAHN 1,993,058
METHOD AND APPARATUS FOR PRODUCING DIFFRACTION PATTERNS
Filed May 15, 1931   4 Sheets-Sheet 3
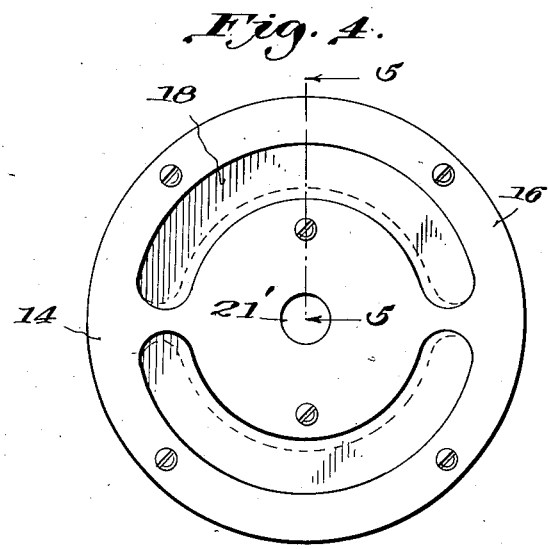
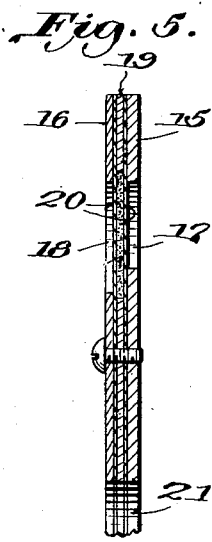
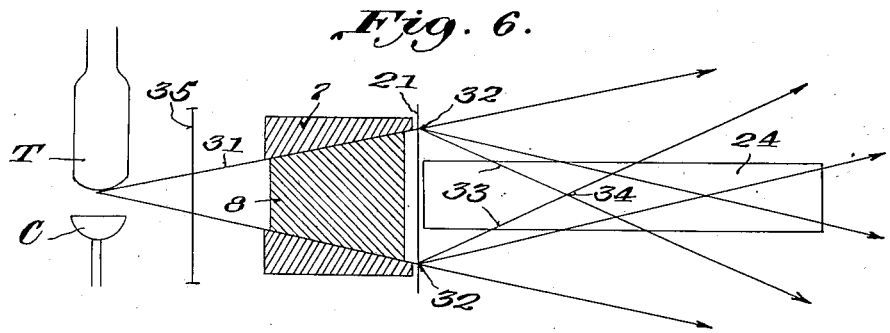
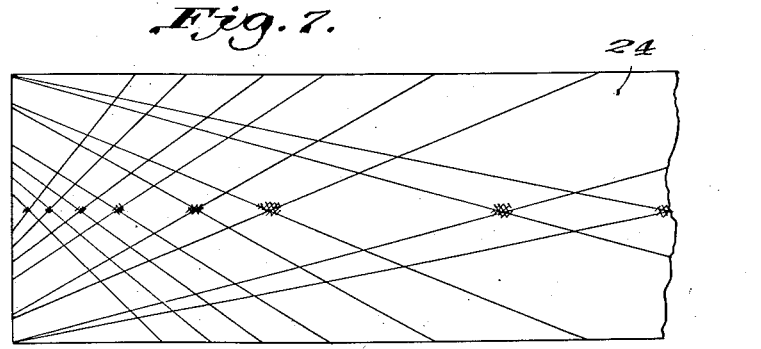
Inventor
Thomas Marshall Hahn
By Gillson, Mann & Cox
Attorneys Patented Mar. 5, 1935

1,993,058

UNITED STATES PATENT OFFICE 1,993,058

METHOD AND APPARATUS FOR PRODUCING DIFFRACTION PATTERNS

Thomas Marshall Hahn, Lexington, Ky.

Application May 15, 1931, Serial No. 537,693

25 Claims. (Cl. 250—34)

My invention relates to a method of producing diffraction patterns for analysis of crystalline materials and to apparatus useful in practicing the method.

More particularly the invention contemplates a method of and means for passing photographically active rays through a specimen of material to be analyzed so as to cause the rays to be diffracted by the crystalline constituents of the material, and subjecting a sensitized surface to the influence of the diffracted rays, whereby there are obtained, after suitable well understood development of the sensitized surface, patterns characteristic of the crystalline constituents.

A specific embodiment of the invention contemplates the use of X-rays and provides means for utilizing the emanations from a single source of the rays, say a single X-ray tube, for producing simultaneously diffraction patterns of a plurality of specimens of material.

It is an object of the invention to provide a method and apparatus of the character indicated which will when in operation effect a considerable economy of time and ray energy.

A further object is to provide a method and apparatus capable of producing characteristic patterns which are superior in significance and legibility to patterns produced by prior methods.

The accompanying drawings which form part of this application for Letters Patent illustrate a preferred embodiment of the invention. In the drawings whereon the same reference character designates the same part in the several views, Figure 1 is a top plan view of an embodiment of the apparatus designed to produce simultaneously a plurality of diffraction patterns;

Fig. 2 is a fragmentary view of the structure illustrated in Fig. 1 showing one of the spectographs and certain appurtenant parts in side elevation;

Fig. 3 is a top plan view of the parts shown in Fig. 2;

Fig. 4 is a front elevational view of the specimen holder;

Fig. 5 is a cross sectional detail view of the specimen holder taken along the line 5—5 of Fig. 4;

Fig. 6 is a diagrammatic view of the invention;

Fig. 7 is an approximation, within the limits of a line drawing, of a typical diffraction pattern obtained by practice of the invention.

Figure 1:
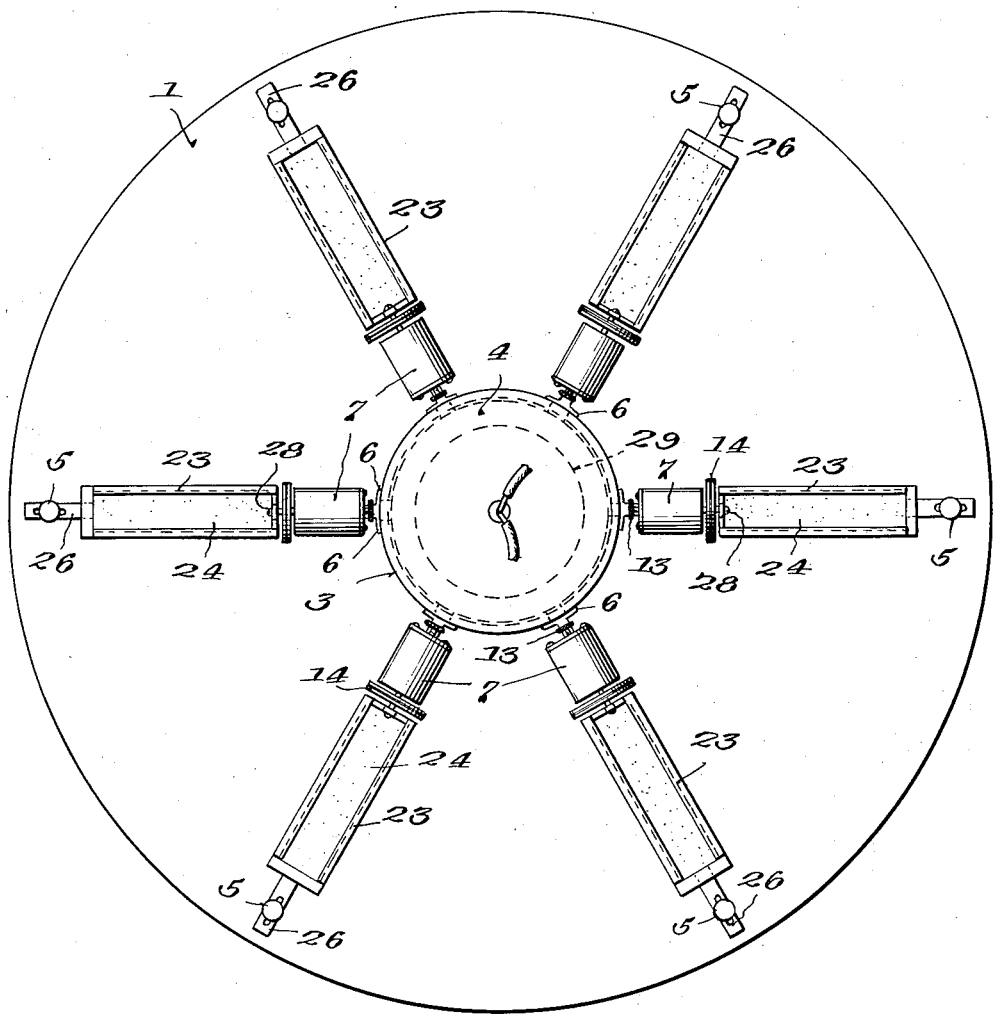

Referring now to the drawings, and first to Figs. 1–5 thereof, which illustrate merely by way of exemplification one preferred type of apparatus embodying the invention, 1 designates a base which conveniently consists of a half-inch steel plate about three feet in diameter. The base forms the top of a large metal drum 2 about three and a half feet high. The sides and bottom of the drum 2 are preferably lined with lead sheathing of say one-sixteenth inch gauge, and the drum constitutes a housing for certain electrical apparatus hereinafter to be described.

Rising from the center of the base 1 is a vertical tubular standard 3, conveniently made of cast iron pipe about eight inches in diameter, lined with lead sheathing of one-eighth inch gauge, and surmounted by a centrally apertured cap 4 of cast iron or the like also lined with lead.

At the peripheral margin of the base 1 a number of equally spaced upstanding posts 5 are provided, and a bracket 6 is secured to the central standard in radial alignment with each of the posts. A spectograph assembly is disposed between each bracket and its cooperating post, as shown in Figs. 2 and 3, so that the complete, multiple spectograph apparatus includes a battery of six or any convenient number of spectographs radially associated with a single central standard, as shown in Fig. 1.

Each spectograph includes a specimen-holding means, a ray-directing means positioned between the specimen holder and the central standard, and a holder for exposing a sensitized film disposed between the specimen-holding means and the outer supporting post 5, all as best shown in Fig. 2.

A convenient and preferred ray-directing means includes an outer member 7 having a frusto-conical bore, the direction of the cone of the bore being such that if projected its apex would lie inside the central standard 3. While the dimensions and proportions of the conical bore are subject to variation between wide limits, I have obtained good results, in apparatus of the dimensions set forth in this application by way of example, with an outer member 7 approximately 10 cm. in length, in which the large end of the bore is about 4 cm. in diameter, and in which the angle subtended by two diametrically opposite elements is approximately 11°. It is to be understood, of course, that these and all other structural dimensions are given merely as a description of a suggested, practical physical embodiment of the apparatus, and that the spirit of the invention and the scope of the appended claims are by no means to be limited thereby. An inner core 8 of complemental frusto-conical exterior contour is provided with an unthreaded axial pintle 9 at its larger end and a threaded axial pintle 10 at its smaller end. Pintle 9 is journalled in cross bearing member 11, and pintle 10 is threaded through cross bearing member 12, the bearing members being carried diametrically across the large and small ends respectively of the outer member 7. Screwthreaded pintle 10 is conveniently provided with a milled head 13. It will be obvious that rotation of the head 13 will result in moving the core 8 axially with relation to the outer member 7 to increase or decrease the thickness of the conical slit defined by the core and outer member.

The specimen holder is designated generally 14 and as best shown in Figs. 4 and 5 includes a pair of disks 15, 16, provided with substantially circular slots 17, 18, respectivey, which register through the major portions of their extent. A similar spacer disk 19 is interposed between disks 15 and 16, and transparencies 20 may be positioned between disk 19 and each of disks 15 and 16. A sample of the material to be patterned is carried in the circular slot between the transparencies 20.

The holder 14 is centrally apertured at 21 through which aperture core pintle 9 is received for mounting the holder.

The preferred means for positioning the sensitized surface, best shown in Figs. 2 and 3, comprises a frame, conveniently rectangular in shape and including oppositely channeled side members 23, 23, adapted to support a sensitized film 24. When an X-ray tube is used as the ray source the film 24 is encased in the usual opaque envelope. The side members are connected by an outer cross member 25 having an extension 26 apertured to receive the upper end of post 5 and by an inner cross member 27 apertured to receive a bolt 28 threaded into core pintle 9.

It will be evident from the foregoing that each spectograph assembly includes a rigidly associated ray-directing element, a film holder, and a specimen holder interposed therebetween.

The central standard 3 contains a source of photographically active rays, preferably an X-ray tube 29, and the wall of the standard is apertured at 30 adjacent each spectograph to permit rays from the source to enter the ray-directing means.

For a particular apparatus I may use as the beam source a standard water-cooled molybdenum target hot cathode tube but this is a matter for selection. The tube is preferably supported at its upper end only, and may be energized through the medium of a high voltage transformer housed in the drum 2. This transformer has only one developed high tension terminal, the other being grounded through a milliammeter on a suitable control panel. The filament transformer is conveniently built into the high tension transformer and is connected directly to the high potential terminal although the voltage of the primary of the filament transformer is regulated by a variable inductance on the control panel. The voltage supplied the primary of the high voltage transformer may be controlled by an autotransformer with variable taps. I prefer to provide on the control panel an overload circuit breaker, an automatic switch operated by the water pressure, a voltmeter, and a water pressure gauge, as and for purposes which will be readily understood.

For the protection of the operator, lead cones may be clipped over each of the spectographs during an exposure, according to common practice.

The operation of the apparatus which has been described is briefly as follows:

A specimen of the substance to be analyzed is mounted in the holder 14, and a sheet of sensitized film is positioned in the film holder. These two holders are then assembled with the ray-directing members 7, 8, and the core 8 is adjusted with relation to the outer member 7 to provide a conical slit of proper thickness. The latter dimension varies according to the dimensions and power of the apparatus and the nature of the material to be analyzed, but I have found in practice that with apparatus of the size herein exemplified a slit thickness of 0.5 mm. or less gives good results. The X-ray tube is then energized.

While I prefer to employ a sensitized film, it may in certain instances be desirable to use other means for detecting the diffracted rays, such for example as an ionization chamber and suitable auxiliary apparatus.

Fig. 6 is a schematic representation of the apparatus and method in operation. In the figure, T indicates the target and C the cathode of an X-ray tube from which a primary beam 31 of right circular conical contour is directed by the members 7, 8, through a circular area of the layer of material. From each point 32 along this circular area, the rays are diffracted along the surfaces of right circular cones the axes of which lie in the conical surface of the primary beam 31. The diffracted cones have apical angles $2\Theta$, where $\Theta$ is given by the Bragg equation $$n\lambda = 2D_{hkl} \sin \Theta \qquad (1)$$

where $n$ is the order of the pattern, $\lambda$ is the wave length of the primary ray, and $D_{hkl}$ is the spacing between the planes of the crystal constituent of the material. These diffracted cones of a given angle $2\Theta$ will all intersect the axis of the primary beam 31 at a single point 34, the position of this point being a function of $\Theta$, $\lambda$, and the constants of the apparatus. The sensitized surface 24 will thus record the position of all such points which result from the various values of $\Theta$, $\lambda$, and $D_{hkl}/n$, the trace of the resultant cone 33 on the surface 24 resembling two intersecting straight lines with a comparatively intense spot at the point of intersection.

Fig. 7 approximates, as closely as is possible in a line drawing, the appearance of a typical diffraction pattern obtained by practice of the invention. The figure illustrates the significant display of white lines converging in small white areas against a black background obtained in a print from a sensitized surface which has been suitably exposed in the apparatus.

The typical diffraction pattern shown in Fig. 7 was obtained from a sheet of commercial aluminum 5 x 5 cm. square, 0.6 mm. thick, exposed for four hours at 25 milliamperes. The customary filter of zirconium, designated 35 in Fig. 6, was used but no intensifying screen was used. The pattern shows several intense diffraction points, corresponding to the more prominent diffracting planes typical of the face centered cubic crystal of aluminum. The spacing of a set of planes producing a given diffraction point is given by Equation (1) and $$S \tan (2\Theta - \alpha) = R \qquad (2)$$

where $R$ is the radius of the rayed sample, $\alpha$ the angle the primary beam makes with the axis, and $S$ the distance from the spot to the plane of the sample. Values of $2\Theta$ from $\alpha$ up to nearly 90° will be recorded on the film. If the distances of the spots from the sample are plotted as abscissas against the calculated spacing of the planes producing the spots as ordinates, the curve shown in Fig. 8 is obtained.

Figure 8:
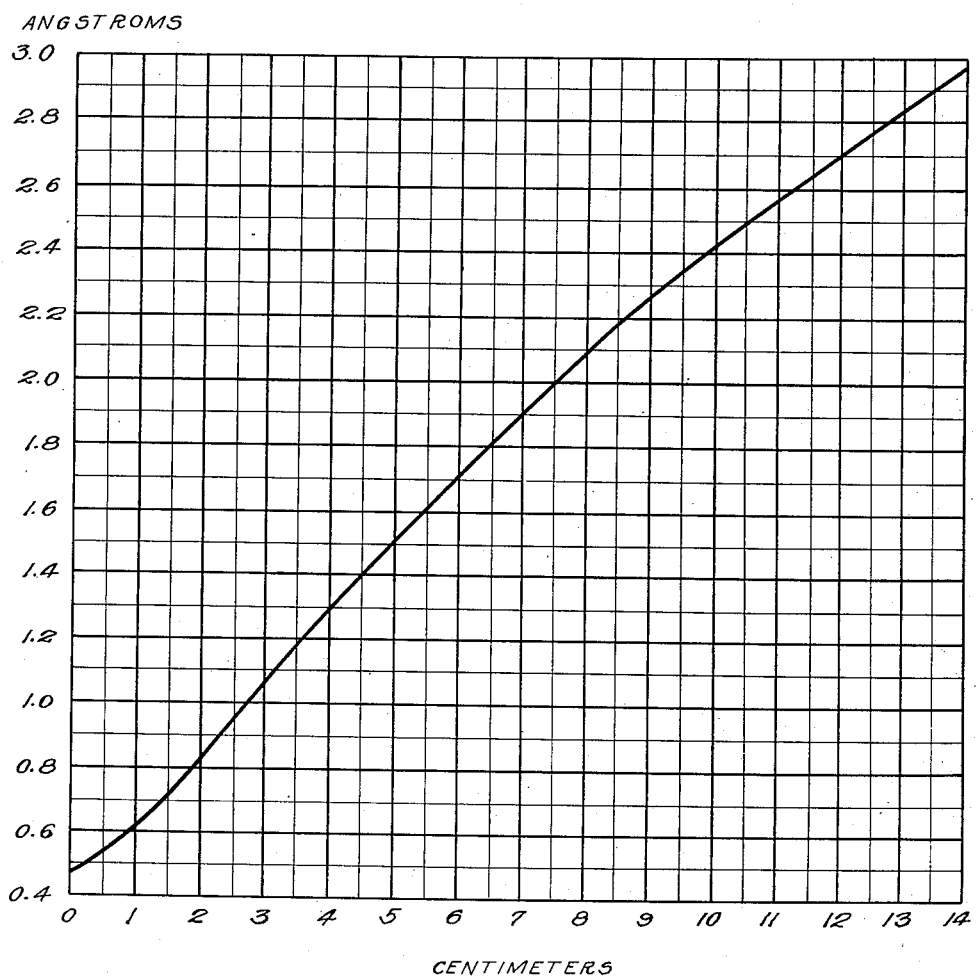
Fig. 8 is a graph showing a curve plotted with $D_{hkl}/n$ as ordinates and values of S as abscissas according to Equations (1) and (2) hereinafter given.

It will be evident from Fig. 8 that from the range 0.5 to 3.0 Angstrom units the curve is roughly a straight line, and thus the spacing of the planes is approximately proportional to the distances S of the spots from the specimen or sample. Since points from the higher order diffracting planes occur at lesser distances, there is a tendency to equalize the intensity of the high and low orders.

The data and results of the exposure shown in Fig. 7, which is typical of many obtained, are recorded in Table I. No corrections for film shrinkage, thickness of film, or refraction have been made, but the results are such as might be expected from the apparatus in use in a commercial laboratory.

Table I

| S | $D_{hkl}/n$, Exp. | $D_{hkl}/n$, Theor.[1] |
|---|---|---|
| 9.58 | $2.34 \times 10^{-8}$ cm. | $2.34 \times 10^{-8}$ cm. |
| 7.70 | 2.02 | 2.02 |
| 4.72 | 1.43 | 1.43 |
| 3.77 | 1.22 | 1.22 |
| 3.49 | 1.16 | 1.17 |
| 2.85 | 1.02 | 1.01 |
| 2.49 | 0.94 | 0.93 |
| 2.38 | 0.91 | 0.90 |
| 2.04 | 0.84 | 0.83 |
| 1.85 | 0.79 | 0.79 |
| 1.53 | 0.72 | 0.72 |
| R=2.020 cm. | $\alpha = 5° 35'$ | $\lambda = 0.712 \times 10^{-8}$ cm. |

[1] The third column contains the theoretical values of $D_{hkl}/n$ as calculated from data given by A. W. Hull, Phys. Rev. 10, 661, 1917.

I prefer to position the sensitized film 24 in the plane of the axis of the primary conical beam 31, and I have accordingly described the invention thus embodied. I have found, however, that in some instances it may be desirable to dispose the sensitized surface of the film normal to the axis of the primary conical beam 31, or even at an angle thereto. When the sensitized surface is normal to the axis of the primary beam the diffraction pattern is obtained in the form of a number of concentric circles.

From the foregoing explanation, in conjunction with the accompanying drawings, it will be clear that a specific and preferred form of the invention contemplates directing a plurality of photographically active rays, specifically X-rays, in a substantially conical primary beam through a curved band of the material to be analyzed. The rays of the primary beam are diffracted by the material, so that a substantially conical beam of diffracted rays originates in the curved band of the material. This diffracted beam is received on a sensitized surface, which consists preferably of a film disposed in the plane of the axis of the primary beam, which plane contains the apex of the conical diffracted beam. By this preferred disposition of the parts of the apparatus a relatively small area of the sensitized surface is subjected to rays from an indefinitely large number of points in the curved band of the material, so that a clearly defined diffraction pattern may be obtained from a given material in a fraction of the time required by prior methods and apparatus, and in many cases patterns may be obtained from materials on which the methods and apparatus of the prior art, which failed to concentrate a large number of rays in a focal point, were entirely ineffective.

In crystal analysis, the diffraction pattern, however recorded, is capable of interpretation because the primary ray has a known wave length. Obviously, therefore, if a known crystalline substance is used or a known grating, it is possible to determine the wave length of the primary ray. The apparatus, therefore, lends itself to this use with equal advantage.

It is to be understood that I have shown and described the present invention in a certain preferred form of embodiment only, merely for purpose of exemplification. The dimensions, proportions and structural details set forth herein form no part of the invention broadly considered. On the contrary, the invention is capable of embodiment in other and further modified forms, and all such modifications, to the extent that they embody the principles of the invention as pointed out in the appended claims, are to be deemed within the scope and purview thereof.

Having thus described my present invention what I claim and desire to secure by Letters Patent is:

1. Apparatus for producing a diffraction pattern characteristic of a crystalline material including a frame for holding a specimen of the material provided with a substantially arcuate opening adapted to expose a substantially arcuate band of material, means positioned at one side of the frame for directing a substantially conically flaring beam of photographically active rays, through the material and means mounted at the opposite side of the frame for positioning a sensitized surface to receive rays of said beam diffracted through the material.

2. Apparatus for producing a diffraction pattern characteristic of a crystalline material including means for holding a specimen of the material, means positioned at one side of the holding means, including an outer member provided with a frusto-conical bore and an inner core member of complemental frusto-conical exterior contour, said members co-operating to define a slit, for directing a substantially conically flaring beam of photographically active rays through the material and means mounted at the opposite side of the holding means for positioning a sensitized surface to receive rays of said beam diffracted through the material.

3. Apparatus for producing a diffraction pattern characteristic of a crystalline material including means for holding a specimen of the material, means positioned at one side of the holding means, including an outer member provided with a frusto-conical bore and an inner core of complemental frusto-conical exterior contour, axially adjustable with relation to the outer member to co-operate with the outer member to define a slit, for directing a substantially conically flaring beam of photographically active rays through the material and means mounted at the opposite side of the holding means for positioning a sensitized surface to receive rays of said beam diffracted through the material.

4. Apparatus for producing a diffraction pattern characteristic of a crystalline material including means for holding a specimen of the material, means positioned at one side of the holding means for directing a substantially conically flaring hollow beam of photographically active rays through the material and a frame mounted at the opposite side of the holding means for holding a photographic film to receive the rays of said beam diffracted through the material, adapted to be mounted so that the photographic film is positioned in substantially the plane of the axis of the ray-directing means.

5. Apparatus for producing a diffraction pattern characteristic of a crystalline material including means for holding a specimen of the material, means positioned at one side of the holding means, including an outer member provided with a frusto-conical bore and an inner core member of complemental frusto-conical exterior contour, said members co-operating to define a slit, for directing a substantially conically flaring beam of photographically active rays through the material and a frame mounted at the opposite side of the holding means for holding a sensitized surface to receive the rays of said beam diffracted through the material, adapted to be mounted so that the sensitized surface is positioned in substantially the plane of the axis of the inner core.

6. The method of producing a diffraction pattern which includes generating a divergent beam of rays, intercepting all of the rays other than a beam comprising rays whose degree of divergence from an intercepted ray is substantially the same, passing the unintercepted rays through a crystalline substance, and acting upon ray-sensitive means with the diffracted rays.

7. The method of simultaneously producing a plurality of diffraction patterns which includes generating a divergent beam of rays, absorbing all of the rays other than a plurality of beams of rays, the degree of divergence of the rays in each unabsorbed beam from an absorbed ray being substantially the same, passing each of said beams through a specimen of diffracting material, and recording the diffraction pattern from each of said beams.

8. In an apparatus for studying the structural characteristics of a material, means for generating diverging rays, means for absorbing part of said rays to produce a thin walled primary beam having the shape of a right circular conical surface, means for interposing a layer of the material in the path of the primary beam, and means for recording the pattern resulting from the diffraction of the primary beam by the layer of material.

9. In an apparatus of the class described, in combination, means for producing a divergent beam of rays having the shape of a substantial portion of the surface of a right circular cone, means for supporting a layer of crystalline material to intercept said beam substantially in an arc of a circle, and a planar sensitized surface passing substantially through a point of convergence of the inwardly-diffracted rays leaving the layer of material.

10. In an apparatus for producing a diffraction pattern, means for generating a thin-walled divergent beam of rays in the shape of a portion of a conical surface, means for supporting a layer of material in position to intercept said beam, and a planar sensitized surface disposed in the path of the rays leaving the layer of material and perpendicular to the axis of the primary conical beam.

11. In an apparatus for simultaneously producing a plurality of diffraction patterns, means for generating diverging rays, means for absorbing part of said rays to produce a plurality of thin-walled primary beams having the shape of circular conical surfaces, means for supporting a layer of crystalline material to intercept each of said beams, and ray-sensitive means in the path of the diffracted rays leaving each specimen of crystalline material.

12. A holder for a specimen to be used in the production of a diffraction pattern including spaced outer plates having curved slots substantially in register and transparent specimen-retaining plates between the outer plates.

13. A specimen holder for diffraction apparatus including spaced outer plates having arcuate slots substantially in register, spaced transparent plates held between the outer plates, and a spacer held between the transparent plates, adapted to co-operate with the transparent plates to retain the specimen.

14. The method of producing and recording diffracted rays which includes generating a suitable primary beam of rays, producing a substantially curved, thin and convergent beam of diffracted rays by suitably arranging a body of diffracting material in the path of said primary beam, and causing said convergent beam of diffracted rays to act upon ray-sensitive means.

15. The method of producing and recording diffracted rays which comprises producing a substantially conical hollow beam of X-rays, passing a substantial part of the beam through a diffracting substance to cause convergent diffracted rays to emanate therefrom, and causing the convergent diffracted rays to act upon ray-sensitive means.

16. The process of analyzing a diffracting material which includes selecting and passing through the material a substantially curved thin beam of rays, and placing ray-sensitive means in the path of convergent diffracted rays which are thereby caused to emanate from the material.

17. The method of studying the structural characteristics of a material which comprises generating suitable rays, intercepting part of the rays to produce a substantially curved thin beam, passing the beam through a specimen of the material so that convergent diffracted rays are caused to emanate from the specimen, and comparing the direction of convergent diffracted rays with the direction of the corresponding rays of the primary beam.

18. The method of producing a diffraction pattern characteristic of a substance to be analyzed which comprises producing a substantially curved thin beam of rays, passing the beam through a specimen of the substance, and recording the trace on a sensitized surface of a convergent diffracted beam which is thereby caused to emanate from the specimen.

19. In an apparatus of the class described, means for producing a suitable beam of rays, means for supporting a thin layer of refracting material in the path of the beam so that it is intersected by the beam along a substantially curved narrow strip, and means for detecting convergent diffracted rays which emanate from said narrow strip.

20. In an apparatus for producing and detecting diffracted rays, means for producing a primary beam of rays, means for supporting a layer of material in the path of said beam adapted to produce convergent diffracted rays from the primary beam, ray-detecting means arranged in the path of convergent diffracted rays leaving said layer and means for intercepting a central portion of the primary beam to avoid masking the convergent diffracted rays.

21. In apparatus of the class described, a source of rays, means for diffracting said rays so as to cause a plurality of like diffractions to converge, and means in the path of the convergent rays for determining the point of convergence of the diffractions.

22. In apparatus of the class described, a source of rays, means for diffracting said rays to produce two or more groups of coaxially converging rays, the rays of each group making equal angles with respect to the common axis but the rays of different groups making unequal angles with respect to said axis, and means in the path of said convergent rays for determining the point of convergence of the rays in each of the groups.

23. In an apparatus for diffracting rays from an original beam and recording the diffracted rays, a ray selecter adapted to intercept a part of the original beam and having an aperture that transmits a substantially curved thin primary beam, means for supporting a diffracting material in the path of said beam whereby convergent diffracted rays are produced for recording, and ray detecting means in the path of convergent diffracted rays.

24. In an apparatus of the class described, in combination, means for producing a substantially curved, thin-walled divergent beam of rays, means for interposing a specimen of material in the path of said beam such that diffraction results, and means for determining the points of convergence of the inwardly-diffracted rays leaving the specimen.

25. In an apparatus of the class described, a source of rays, means for diffracting said rays so as to produce converging rays adapted to intersect along a common axis, and ray sensitive means positionable at a plurality of the points of intersection for ascertaining their relative positions.

THOMAS MARSHALL HAHN.